United States Patent
Iwai et al.

[11] Patent Number: 5,856,190
[45] Date of Patent: Jan. 5, 1999

[54] MULTISTAGE PLANT CULTURE METHOD AND MULTISTAGE PLANT CULTURE APPARATUS FOR USE THEREIN

[75] Inventors: Kazuya Iwai; Kiyoshi Usui, both of Tochigi, Japan

[73] Assignee: Kabushiki Kaisha Seiwa, Tokyo, Japan

[21] Appl. No.: 704,794

[22] PCT Filed: Mar. 9, 1995

[86] PCT No.: PCT/JP95/00388

§ 371 Date: Nov. 15, 1996

§ 102(e) Date: Nov. 15, 1996

[87] PCT Pub. No.: WO95/24119

PCT Pub. Date: Sep. 14, 1995

[30] Foreign Application Priority Data

Mar. 11, 1994 [JP] Japan ........................................ 6/66540
Dec. 27, 1994 [JP] Japan ........................................ 6/337912

[51] Int. Cl.$^6$ .................. C12N 5/00; A01G 31/00; A01G 31/02
[52] U.S. Cl. ...................... 435/420; 47/58; 47/59; 47/60; 47/62; 47/65
[58] Field of Search .................... 47/58, 59, 60, 47/62, 65; 435/420

[56] References Cited

U.S. PATENT DOCUMENTS 4,216,617 8/1980 Schmidt ........................................ 47/62

FOREIGN PATENT DOCUMENTS 1491459 6/1966 France .

*Primary Examiner*—Leon B. Lankford, Jr.
*Assistant Examiner*—Christopher R. Tate
*Attorney, Agent, or Firm*—Steinberg & Raskin, P. C.

[57] ABSTRACT

A multistage plant culture method and apparatus for carrying out the method are disclosed. Culture beds constituted by rooting medium contained in culture containers and initially containing plant seedlings are moved, in order; from an uppermost level to a lowermost level after the plants have been grown at each level for a predetermined period. After cropping, the culture bed at the lowermost level is removed, and a new culture bed containing seedlings is placed at the vacant uppermost level. This sequence is repeated. The culture containers have a predetermined length and are supported on a plurality of support means arranged vertically at different heights. A culture container lift unit includes culture container holding means capable of movement towards or away from the culture containers, and also capable of holding the containers and moving them up or down to facilitate their movement between the different levels. The invention thus enables continuous cropping to be achieved with increased yield and an increased amount of sunlight to reach the plants, particularly at the lower levels. The invention also lends itself to automation, to the reduction of any requirement of manual operation, and to large-scale culture.

13 Claims, 5 Drawing Sheets

MULTISTAGE PLANT CULTURE METHOD AND MULTISTAGE PLANT CULTURE APPARATUS FOR USE THEREIN

BACKGROUND OF THE INVENTION

1. Field of the Invention

The present invention relates to a multistage plant culture method adapted to grow plants such as Cucurbitaceae, Solanaceae, Rosaceae, and the like for fruit harvest, and a multistage plant culture apparatus for use in such a multistage plant culture method.

2. Description of the Related Arts

Culture in greenhouses of fruit vegetables such as eggplants, tomatoes, cucumbers, melons and the like and fruit trees has recently been carried out extensively. In such culture methods, seedlings are planted in soil in open culture or in culture beds such as culture containers filled with rooting media of rock wool slab or the like. In the culture of fruit vegetables using culture beds, seedlings are planted in such culture beds placed on the ground and are allowed to grow upwards, and, in order to achieve as high a yield as possible, fruit is harvested after fruiting from multistage flower clusters. For example, tomato plants are usually grown to bear fruit up to the fifth or sixth flower cluster before harvest.

In such tomato plant culture, i.e. up to the fifth or sixth flower cluster, two crops a year are possible in general. From planting to the end of harvesting represents one cycle and after the first crop, a certain resting period (one week to one month) is taken for clearing out the remaining plants, sterilizing the culture beds and the like before commencing the second crop. Even if the resting period is made as short as possible and the seedlings of the second crop are planted immediately after the first crop has finished (so as to grow the plants up to the highest possible flower cluster) only two crops a year up to the seventh or eighth flower cluster are possible. Moreover, the commencement of harvesting the fruit is usually around the flowering time of the fifth flower cluster and hence the period from planting to the harvesting of the first fruit represents a lost period in which no fruit can be harvested.

Accordingly, in such a conventional culture method, there is a long lost period from planting to the start of harvest, and the harvesting period is restricted. Hence, a culture method capable of allowing a continuous harvest extending over a long period has been sought.

In order to meet this demand, a method for growing plants up to a higher multistage flower cluster has been developed; and although an initial lost period still exists in this method, plants can be continuously grown up to more than the thirtieth flower cluster stage. However, since the growth of stems and leaves occurs simultaneously with flowering, fruiting and thickening, there is required a supply of nutrient solution which maitains a balance between vegetative growth and reproductive growth. It is quite difficult to effect such a nutrient solution supply and its success largely depends on the technical skill of the growers. Hence, such a high multistage culture method is too labour intensive and is thus not suited to automation of the nutrient solution supply and large scale culture.

French Patent No. 1,491,459 discloses a method for growing up plants on a plurality of stages at different heights, the growing plants being in order moved from the upper stages down to the lower stages. However, in this conventional method, concerning a timing of plant moving, only the following description appears, that is, different predetermined periods depending on varieties of plants to be cultivated and predetermined amounts of daily solar radiation required for flowerings are used as criteria. Hence, in the end, a judgement of whether or not the timing of plant moving has come, in other words, whether or not the plant has received a sufficient amount of daily solar radiation required on a certain stage is carried out by worker's subjectivity. This conventional method is thus not suited to automation of the culture work and large scale culture.

SUMMARY OF THE INVENTION

It is therefore an object of the present invention to provide a multistage plant culture method free from the foregoing problems of the prior art, which is capable of providing a continuous harvest for a long period and allowing a ready supply of nutrient solution, and which is suited to automation, to reducing manual tasks and capable of large scale culture.

It is another object of the present invention to provide a multistage plant culture apparatus which is capable of allowing such a multistage plant culture method to be carried out effectively, particularly, by reducing interception of sunlight falling on plants growing in lower culture containers, and which is suited to such a multistage plant culture method.

In accordance with one aspect of the present invention, there is provided a multistage plant culture method for growing plants planted in a culture bed, with the plants being aligned in at least one line in a longitudinal direction of the culture bed, comprising the steps of arranging at least one culture bed on each stage to grow the plants in a multistage plant culture apparatus having at least two (upper and lower) stages at different heights; moving the culture beds down in order from the uppermost stage to the lowermost stage after growing the plants in the culture bed placed on each stage for a predetermined culture period, with the culture bed placed on the lowermost stage being removed; placing a new culture bed containing the plants planted therein on the vacant uppermost stage; and repeating the steps of moving said culture beds down and placing said new culture beds on the vacant uppermost stage.

In this multistage plant culture method, a number N (N integer) of stages of the multistage plant culture apparatus can be determined so as to satisfy a formula H×N≦T1, wherein T1 represents a planned whole culture period from one of seeding, cutting and grafting to harvest finish and H represents a planned harvest period. The culture period on each stage is determined to be equal to the planned harvest period H. Thus a seedling raising period P, defined as being from one seeding, cutting or grafting step until the placing of a new culture bed onto the uppermost stage, can be determined so as to satisfy the formula P=T1−(H×N).

Further, a number (N) of the stages of the multistage plant culture apparatus and a culture period (T2) from the uppermost stage to the lowermost stage in the multistage plant culture apparatus can be correctly determined so that a culture period (G) on each stage can be determined so as to satisfy the formula G=T2/N.

Moreover, in this multistage plant culture method, when the multistage plant culture apparatus has two stages, the culture bed is moved down from the upper stage to the lower stage after the plants are grown on the upper stage until the time of early fruiting at the earliest, and until the commencement of harvest at the latest, and thereafter the plants are grown on the lower stage until the harvest is finished. In such a method, it is preferable that the culture bed can be moved down from the upper stage to the lower stage after the plants have grown until the time of growing-tip pinching is reached and that thereafter the plants may be grown on the lower stage until the harvest is finished.

Similarly, when the multistage plant culture apparatus comprises three stages, the culture bed may be moved down from an upper stage to a middle stage after the plants are grown on the upper stage until the time of early flower-bud differentiation at the earliest and until the time of early fruiting at the latest. The culture bed may be moved down from the middle stage to a lower stage after the plants have grown on the middle stage until the time of early fruiting at the earliest and the commencement of harvest at the latest, and thereafter the plants may be grown on the lower stage until the harvest finishes. In such an apparatus, it is preferable that the culture bed is moved down from the upper stage to the middle stage after the plants have grown on the upper stage until the time of early flower-bud differentiation at the earliest and the time of early fruiting at the latest. The culture bed is moved down from the middle stage to the lower stage after the plants have grown on the middle stage until the time of growing-tip pinching, and thereafter the plants are grown on the lower stage until the harvest is finished The multistage plant culture method is suitable for plants to be grown by either a growing method or a training method for successively flowering and fruiting in at most three different parts, and in particular for tomato plants.

During the supply of nutrient solution in the multistage plant culture method, drainage of the nutrient solution supplied to plants mainly involved in vegetative growth is collected and the collected drainage can be supplied to plants mainly involved in reproductive growth.

In accordance with another aspect of the present invention, there is provided a multistage plant culture apparatus for growing plants on a plurality of stages, comprising a support unit including a plurality of support means for supporting culture containers having a predetermined length, the support means being vertically arranged at different heights; and a culture container lift unit including culture container holding means which are capable of moving either to or from the culture containers, and holding the culture containers and moving the culture containers up and down so as to move down the culture containers from an upper support means to a lower support means.

In this case, the support unit can include hang rod members for supporting the culture containers via hang wires to be connected to the culture containers, the hang rod members being arranged above the culture containers in the longitudinal direction thereof; and brackets for supporting the hang rod members, which are mounted to upright pillars at different heights so as to be perpendicular to the longitudinal sides of the culture containers. Further, container support members mounted to the upright pillars for supporting end portions of the culture containers can be used as the support means.

Further, the support means can include container support members mounted to upright pillars for supporting end portions of the culture containers, and the support unit can include brackets for supporting rod members, which are mounted to upright pillars at different heights so as to be perpendicular to the longitudinal sides of the culture containers; and leading cords suspended from the rod members down toward the culture containers lead in the direction of growth of each plant.

The culture container holding means of the culture container lift unit can approach, whilst holding the culture containers, at least one of the hang rod members and the culture containers.

The culture container lift unit is preferably movable along one side of the support unit in a longitudinal direction of the culture containers. For example, guide members are installed on a base surface along one side of the support unit in the longitudinal direction of the culture containers and hence the culture container lift unit is movable on the guide members. In this example, the culture container lift unit includes a base which includes a first base member movable on the guide members; and a second base member mounted to the first base member to be movable in a direction perpendicular to the direction of movement of the first base member, and by moving the second base member, the culture container holding means can move to or from the culture containers.

In addition, the multistage plant culture apparatus preferably further includes a nutrient solution supply system including liquid supply tubes for supplying a nutrient solution to media within the culture containers, said tubes having liquid receiving inlets at one end and small openings in their peripheral walls, and being mounted within the culture containers in the longitudinal direction thereof. The system also includes nutrient solution supply tubes for supplying the nutrient solution to the liquid supply tubes, which have tips facing the liquid-receiving inlets of the liquid supply tubes without being physically connected therein, as well as a drainage discharge system including drainage discharge tubes mounted to project from the culture containers; and drainage tubes facing the drainage discharge tubes without being connected thereto.

Further, the multistage plant culture apparatus of the present invention can comprise culture containers having a predetermined length; and a support unit including hang rod members for supporting the culture containers via hang wires to be connected to the culture containers, which are arranged above the culture containers in the longitudinal direction thereof; and brackets for supporting the hang rod members, which are mounted to upright pillars at different heights so as to be perpendicular to the longitudinal sides of the culture containers.

Also, the multistage plant culture apparatus of the present invention can comprise culture containers having a predetermined length; and a support unit including container support members mounted to upright pillars for supporting end portions of the culture containers. In such an apparatus, the support unit can include brackets for supporting rod members, which are mounted to the upright pillars at different heights so as to be perpendicular to the longitudinal sides of the culture containers; and leading cords suspended from the rod members down towards the culture containers for controlling the growth direction of each plant. Alternatively, the support unit can include hang rod members for supporting the culture containers via hang wires to be connected to the culture containers, which are arranged in a longitudinal direction of the culture containers above the culture containers; and brackets for supporting the hang rod members, which are mounted to the upright pillars at different heights so as to be perpendicular to the longitudinal sides of the culture containers.

BRIEF DESCRIPTION OF THE DRAWINGS

The foregoing and other objects, features and advantages of the present invention will become more apparent from consideration of the following detailed description, taken in conjunction with the accompanying drawings, in which.

DESCRIPTION OF THE PREFERRED EMBODIMENTS

Figure 1:
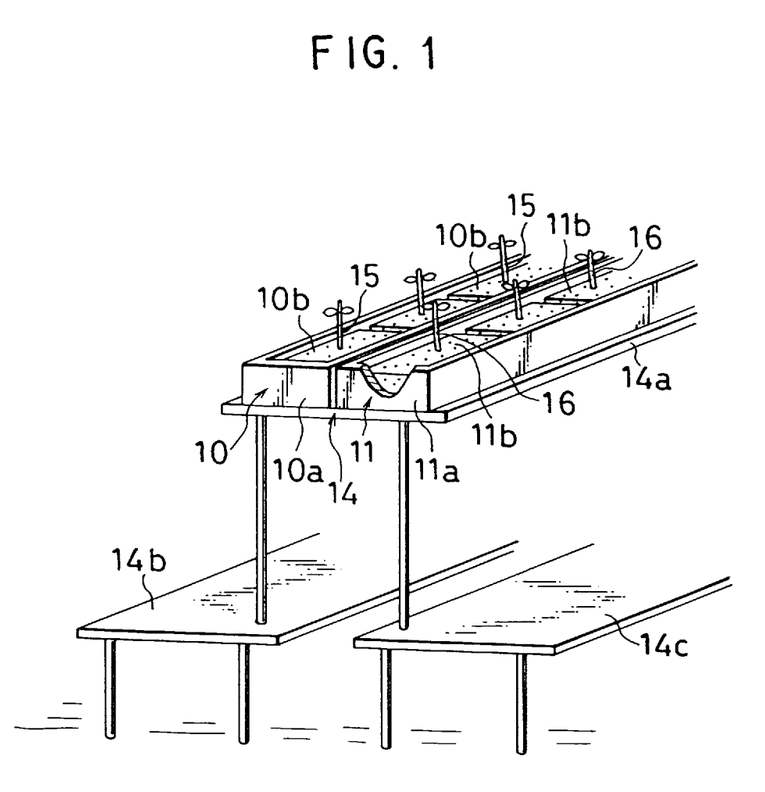
FIG. 1 is a schematic perspective view of a first embodiment of a multistage plant culture apparatus according to the present invention, in which a pair of culture beds with seedlings planted therein is placed on an upper support means.
Figure 2:
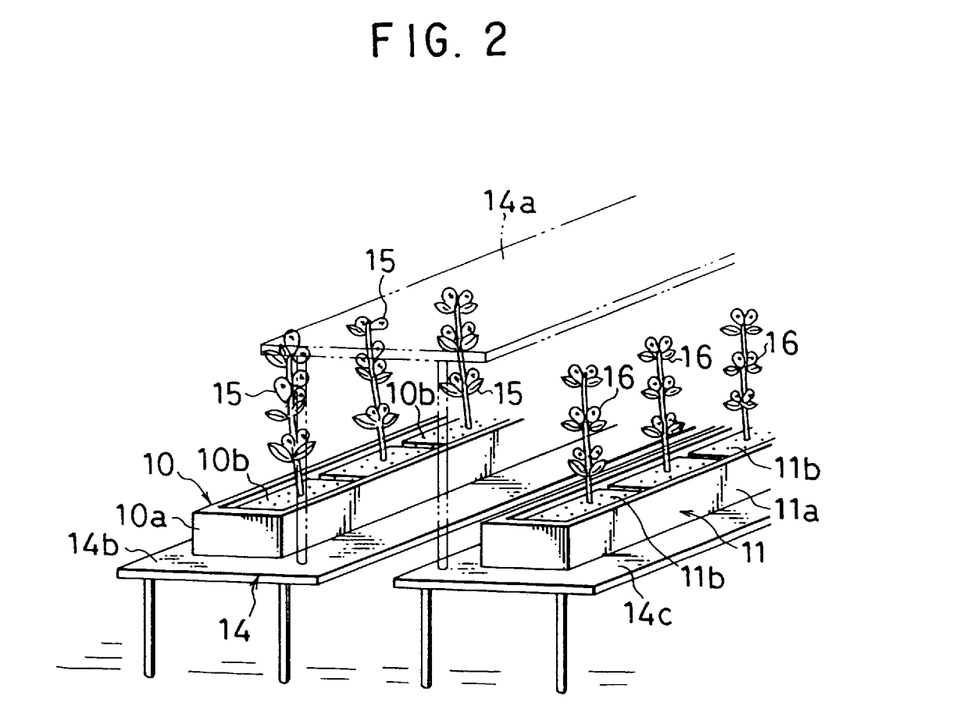
FIG. 2 is a schematic perspective view of lower support means supporting the culture beds moved down from the upper support means in the multistage plant culture apparatus shown in FIG. 1.
Figure 3:
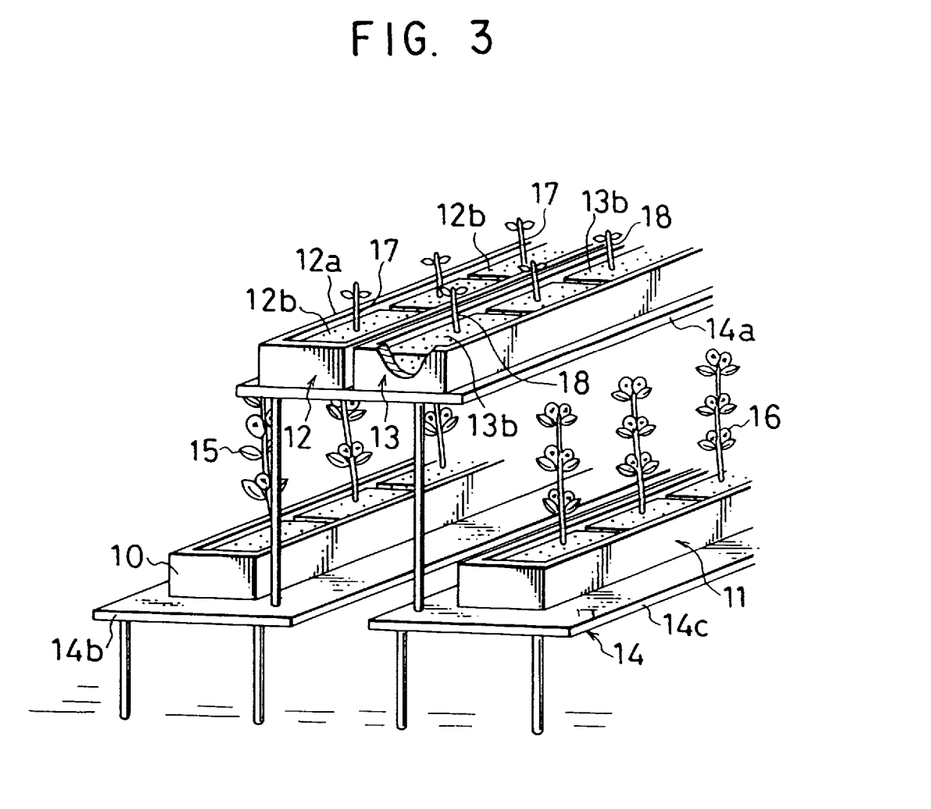
FIG. 3 is a schematic perspective view of the multistage plant culture apparatus shown in FIG. 1, wherein the next two culture beds are placed on the first support means in a manner conforming to that shown in FIG. 2.

Referring now to the drawings, wherein like reference characters designate like or corresponding parts throughout the several views and thus the repeated description thereof can be omitted for brevity, there is shown in FIGS. 1 to 3 the first embodiment of a multistage plant culture apparatus suited to a multistage plant culture method according to the present invention.

In this embodiment, the multistage plant culture method of the present invention will be described, taking tomato plant culture as an example. It is effective and appropriate to use the multistage plant culture apparatus illustrated in FIGS. 4 and 5, which will be described in the second embodiment of the present invention, when performing the multistage plant culture method according to the present invention. However, the first embodiment is described with reference to plant culture apparatus having a simple construction, as shown in FIGS. 1 to 3, to facilitate a better understanding.

First, as shown in FIG. 1, a multistage plant culture apparatus 14 comprises an upper support means 14a composed of a plate material or the like, held by appropriate means such as support rods or the like at a suitable height from a base surface such as the ground surface or a floor surface, and a pair of lower support means 14b and 14c composed of the same material as the upper support means 14a and arranged not directly under, but laterally displaced from, the upper support means 14a on respective sides thereof. The difference in height between the upper support means 14a and the lower support means 14b and 14c is determined depending on the varieties and the type of plants to be grown, so that the plants planted in culture beds placed on the lower support means 14b and 14c may receive sufficient sunlight for growth without its being intercepted by the plants in the culture beds placed on the upper support means 14a.

In this embodiment, the upper support means 14a has a width sufficient to support two culture beds 10 and 11 placed side-by-side and each lower support means 14b or 14c has a width sufficient to support one culture bed. The width of the upper support means 14a can be designed to be is sufficient to support only one culture bed and one of the two lower support means 14b and 14c can be omitted, as required. Further, the upper and lower support means 14a, 14b and 14c can also be made of pipes assembled crosswise.

Moreover, as a supporting surface, that of the ground, floor or the like can be used in place of the lower support means 14b and 14c. In this embodiment, although the two-stage plant culture apparatus is described and illustrated in FIGS. 1 to 3, the number of stages is not restricted to two only and a multistage plant culture apparatus having a plurality of stages at different heights can be used.

Further, if varieties of plants are grown whose fruit quality and the like are not adversely affected by reducing the amount of sunlight after a certain growing stage, the lower support means 14b and 14c can be arranged immediately under the upper support means 14a.

The first and second culture beds 10 and 11 are well known in the art and are composed of culture containers 10a and 11a made of, for example, a wooden or plastic box or plastic sheet. Such culture containers 10a and 11a contain rooting media 10b and 11b such as soil, rock wool as a soil substitute, water including nutrients, or the like. The two culture beds 10 and 11 are mounted on the upper support means 14a with their longer side walls adjacent, as shown in FIG. 1.

In this case, tomato plants seedlings 15 and 16 are planted in media 10b and 11b contained within the culture beds 10 and 11 at a predetermined interval and at a predetermined time, for instance, when the seedlings 15 and 16 have been grown up to the time of flowering of the first flower cluster. In this embodiment, seedlings are firstly grown in a seed bed up to the time of leaf-emergence of the first true leaves (one leaf on each seedling), then the seedlings are transplanted to the block media 10b and 11b to grow in a seedling raising bed. At about the time of early flower-bud differentiation, that is, around the time when two to four true leaves develop (in the case of cutting or grafting, two to four leaves develop in addition to those originally attached), the seedlings in media 10b and 11b are placed into culture containers 10a and 11a positioned in a suitable place other than in the multistage plant culture apparatus 14. After growing on in the culture containers 10a and 11a up to the time of flowering of the first flower cluster, the culture containers 10a and 11a are mounted on the upper support means 14a of the multistage plant culture apparatus 14. Also, after the seedlings grown in the seeding bed have been transplanted to the block media 10b and 11b, the seedlings can be grown on there until flowering and then placed into culture containers 10a and 11a in culture beds 10 and 11 placed on the upper support means 14a.

The seedlings 15 and 16, planted in the first and second culture beds 10 and 11, are grown on the upper support means 14a until the time of early fruiting at the earliest until the start of harvest at the latest, preferably, until the time of pinching out of the growing tip. The growing conditions, such as the amount of light received and nutrient solution supplied during the growth process on the upper support means 14a, affect the quality and yield of the fruit, and thus should be controlled appropriately. In tomato plant culture, each plant is pinched two leaves above the third flower cluster during the growing period on the upper support means 14a. In the culture example of this embodiment, the pinching time is approximately between the time of flower bud-emergence of the third flower cluster and the time of fruiting of the same.

Next, the first and second culture beds 10 and 11 are moved down onto the lower support means 14b and 14c, respectively, as shown in FIG. 2. In two-stage culture, the moving time is nearly the mid-point of the total culture period in the multistage plant culture apparatus 14 in this embodiment, and this moving time varies within the foregoing range depending on the cultural environment. In the case of tomato plants, the seedlings are grown on the upper support means 14a until the aforementioned pinching time. A more preferable moving time to the lower support means 14b and 14c is between the time of early fruiting of the third flower cluster and the start of harvest of the fruit on the first flower cluster. A pair of third and fourth culture beds 12 and 13 are placed on the vacant upper support means 14a, as shown in FIG. 3. In the third and fourth culture beds 12 and 13, the seedlings 17 and 18 are grown in the same manner as described above and are planted in block media 12b and 13b.

After being moved to the lower support means 14b and 14c, the plants (the seedlings 15 and 16) in the first and second culture beds 10 and 11 are grown until their fruit has been harvested. In this case, the tomato plants (the seedlings 15 and 16) enter a coloring period although the fruit of the third flower cluster thickens, and it is not necessary to control growing conditions such as light received and the nutrient solution supplied as strictly as the growing conditions on the upper support means 14a.

Hence, even when the upper support means 14a and the plants on the upper support means 14a intercept the sunlight supplied to the plants on the lower support means 14b and 14c, so as to diminish the amount of light received, the quality of their fruit is not adversely affected. Further, nutrient solution used in the culture on the upper support means 14a and drainage therefrom can be collected and supplied to the plants on the lower support means 14b and 14c. That is, the nutrient solution drained from the plants mainly involved in vegetative growth on the upper support means 14a is collected, and the collected nutrient solution can be supplied to the plants on the lower support means 14b and 14c directly or at a appropriate time after having been stored in a tank. This approach is effective because in their growth stage on the lower support means 14b and 14c plants mainly perform reproductive growth in pinched culture until the third flower cluster of the tomato plants, such as in this embodiment. The approach is also effective because the plants enter the coloring period, except for the thickening of the fruit of the third flower cluster, as described above and below, even when the composition of the nutrient solution is not controlled so strictly, and the quality of the fruit is not adversely influenced.

On the other hand, the seedlings 17 and 18 planted in the block media 12b and 13b of the third and fourth culture beds 12 and 13 placed on the upper support means 14a are grown upwards until the foregoing predetermined time. At this time, the first and second culture beds 10 and 11 are mounted on the lower support means 14b and 14c, so that the sunlight reaching the seedlings 17 and 18 in the third and fourth culture beds 12 and 13 on the upper support means 14a is not intercepted by the plants (the seedlings 15 and 16) in the first and second culture beds 10 and 11 Thereafter, the fruit is harvested from the plants (the seedlings 15 and 16) in the first and second culture beds 10 and 11 and after the end of the harvest, the culture beds 10 and 11 are scrapped or the media 10b and lib in the culture beds 10 and 11 are removed to prepare for the re-use of the culture beds. Next, the third and fourth culture beds 12 and 13 are moved down onto the lower support means 14b and 14c, respectively, and two other culture beds having the seedlings in their media are placed on the upper support means 14a. The foregoing processes are repeated.

Hence, the above described tomato plant culture method yields an increased harvest. In this embodiment, culture of up to the third flower cluster permits eight crops a year. Compared with a conventional culture method (i.e. two crops a year with each crop up to the eighth flower cluster), the present culture method yields approximately 1.5 times as much.

Although a plant culture method using two stages of support means for the culture beds for the plant culture apparatus has been described in this embodiment, the present invention is not restricted to such an embodiment and various changes and modifications can be made. For example, a plant culture apparatus including three stages of upper, middle and lower support means can be used. Thus, the upper and lower support means 14a, 14b and 14c of the two-stage plant culture apparatus can be made to correspond to the middle and lower support means of a three-stage plant culture apparatus. In the upper support means of such a three-stage plant culture apparatus, the seedlings are in the growing stage before being placed on the upper support means 14a of the two-stage plant culture apparatus, that is, between the time of early flower-bud differentiation at the earliest and the time of early fruiting at the latest. More specifically, after seeding, around the time of early flower-bud differentiation, that is, at the time when two to four leaves develop, the seedlings are transplanted to the block media, which are then moved into the culture containers; and these culture containers are then mounted on the upper support means to grow the seedlings or until the time of early fruiting at the latest. Further, the time to transplant the seedlings to the block media can be determined so as to be different from the time at which the seedling-planted block media is placed into the culture containers. The seedlings can be transplanted to the block media about the time of leaf-emergence of the first true leaves (one leaf on each seedling), and the seedling-planted block media can be placed into the culture containers around the time when two to four true leaves develop. Then, after growing on the upper support means until the time of early fruiting at the latest, the culture containers are moved down onto the middle support means.

After being moved down onto the middle support means, in the same manner as in the foregoing two-stage plant culture apparatus, the seedlings are grown on the middle support means until the time of early fruiting at the earliest or the time at which harvest starts at the latest, preferably until the pinching time. The culture containers are then moved down onto the lower support means to grow the plants until the end of harvest.

Although, in the above description, culture involves seeding, it can equally well involve cutting or grafting.

The multi-stage plant culture method of the present invention is not restricted to the foregoing two-stage and three-stage cultures, and a four- or more-stage culture can be carried out. Thus, the growing period at each stage and the moving-down time can be determined on the basis of the results of the foregoing two-stage and three-stage cultures as follows.

First, a total culture period (T1) from seeding, cutting or grafting until the end of harvest and a harvest period (H) are planned on the basis of previous cultural experience. The total culture period (T1) and the harvest period (H) change depending on culture seasons because of differences of temperature, sunshine hours and the like.

Then, the number (N) of stages of the culture apparatus is determined as an integer which satisfies the formula $H \times N \leq T1$ and the culture period on each stage is determined to be equal to the planned harvest period (H). As a result, the culture period on each stage is determined depending on the stage number (N) In this case, the moving-down time is at the end of the culture period on each stage. A seedling raising period (P) from seeding, cutting or grafting until movement onto the uppermost stage of the culture apparatus is determined according to the formula P=T1−(H×N). When P=0, the plants are grown on the uppermost stage of the culture apparatus from the time of seeding, cutting or grafting.

In the foregoing case, after determining the total culture period T1 and the harvest period H, the culture period at each stage may be determined. Further, after planning the stage number (N) and the culture period (T2) from the uppermost stage to the lowermost stage in the culture apparatus, a culture period (G) on each stage can be determined according to the formula G=T2/N.

In this embodiment, although the culture of tomato plants has been described, the multistage plant culture method of the present invention can be applied to other plants such as plants to be grown by a growing method or training method for successively flowering and fruiting in at most three different parts of such plants. Of course, the moving time from one stage to another stage may be varied within the above-described range.

Figure 4:
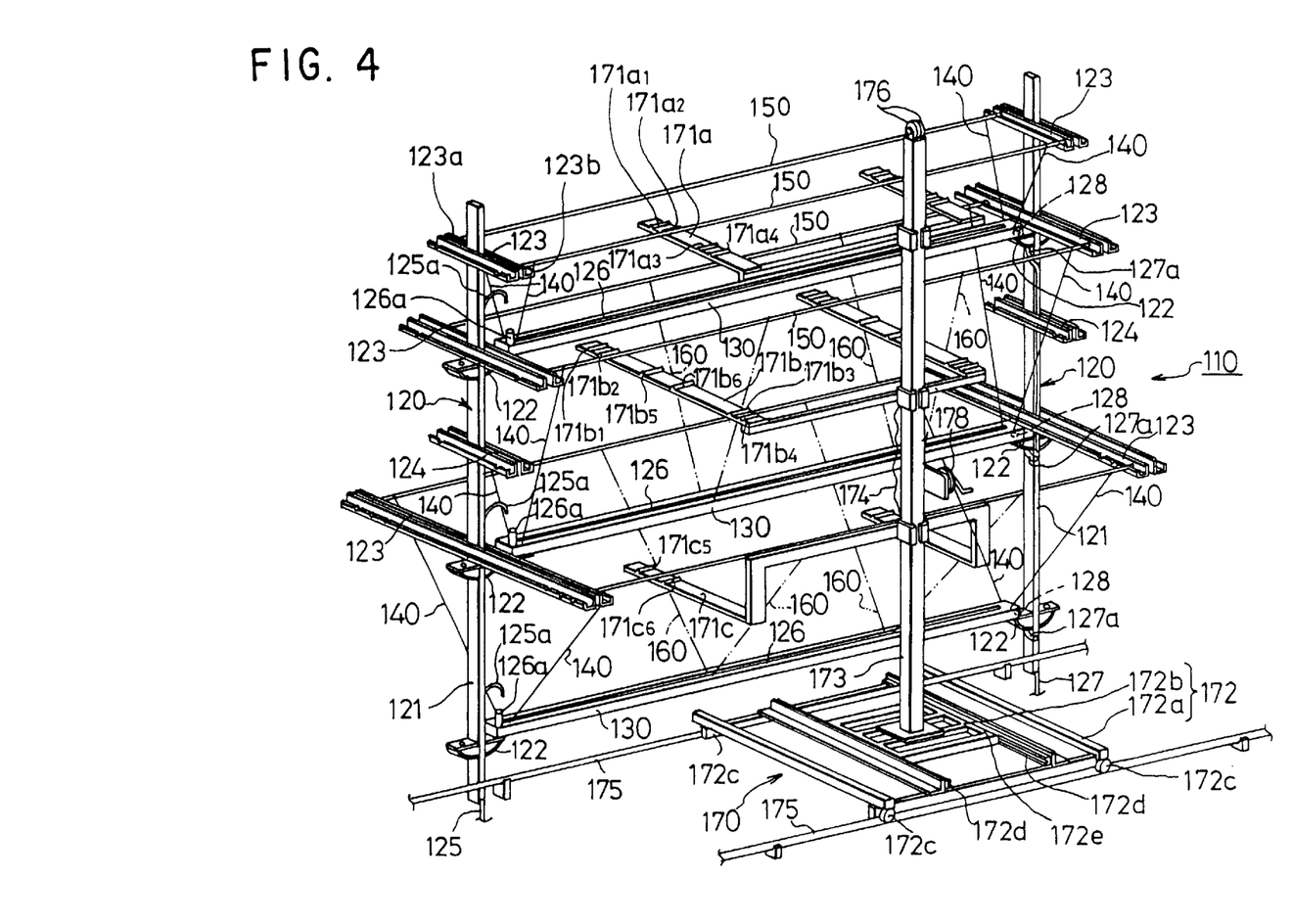
FIG. 4 is a schematic perspective view of a second embodiment of a multistage plant culture apparatus according to the present invention.
Figure 5:
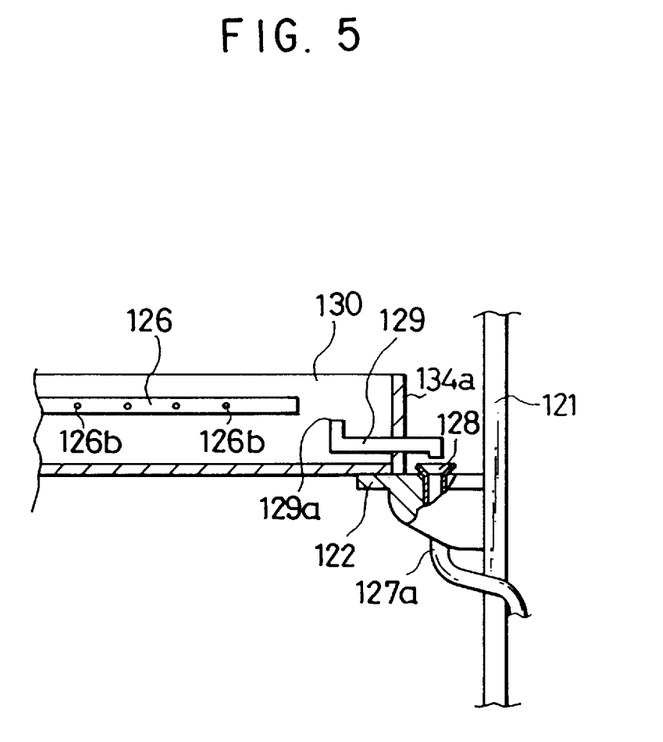
FIG. 5 is a fragmentary cross sectional view showing a drainage system used in the multistage plant culture apparatus shown in FIG. 4.

FIGS. 4 and 5 show another multistage plant culture apparatus for use in the second embodiment of a multistage plant culture method according to the present invention.

As described above in the first embodiment, the construction for the multistage plant culture apparatus used for the multistage plant culture method of the present invention is not restricted as long as the culture apparatus includes a plurality of stages of support means capable of supporting culture beds at different heights. By using the multistage plant culture apparatus shown in FIGS. 4 and 5, the multistage plant culture method of the present invention can be executed very effectively, and thus its use is preferable.

In this embodiment, as shown FIG. 4, the multistage plant culture apparatus 110 comprises a pair of upright support units 120 arranged on opposite sides at a certain spacing; three long and narrow culture containers 130 horizontally mounted to the support units 120; and a culture container lift means 170 for carrying the culture containers 130 up and down.

Each support unit 120 includes one pillar 121 which is mounted upright on a base surface, such as that of the ground or the like, or is suspended from a beam of a greenhouse; container support members 122 mounted to the pillar 121 at suitable heights to project horizontally toward the other pillar 121 of the other support unit 120 so as to support a respective end of the culture containers 130, and brackets 123 mounted to the pillar 121 above the container support members 122 to project in a direction perpendicular to the longitudinal sides of the culture containers 130.

The brackets 123 also act as support means for the culture containers 130. That is, the brackets 123 support hang rod members 150 connected to the culture containers 130, as described later. Hence, in this embodiment, as the support means for the culture containers 130, two means, i.e. the container support members 122 and the brackets 123, are used and one of these two means can be omitted as required.

However, when only the brackets 123 are used, hang strings or wires 140 for coupling the hang rod members 150 to the culture containers 130 are required as support means. Further, when only the container support members 122 are used as the support means, the hang rod members 150 and the brackets 123 can be used as means for holding ends of leading cords 160 for leading the plants in a predetermined growth direction, as described later.

In this embodiment, the two pillars 121 of the two support units 120 are arranged on opposite sides at a certain spacing. As described above, although the container support members 122 are mounted to the pillar 121 so as to project toward the other pillar 121 positioned on the opposite side, the container support members 122 can be mounted to project toward a passage side where the culture container lift means 170 is positioned. Further, and concerning the pillars 121, pillars or pillar-like members of the greenhouse can be used instead for the same purpose without providing special pillars.

Further, in this embodiment, three container support members 122 are mounted to each pillar 121 for conducting three-stage culture. The area of the container support members 122 is preferably made as small as possible so as to minimize interception of the sunlight shining on the culture containers 130 placed in the lower stages. For example, the width of the container support members 122 can be smaller than that of the culture containers 130. Even if the container support members 122 are made very small in area, there is no stability problem for the culture containers 130: this is because the culture containers 130 can be supported by only the hang rod members 150 supported by the brackets 123.

The brackets 123 are mounted to the pillar 121 above the container support members 122 at a spacing equal to the height of the plant to be grown. In this embodiment, the middle and lower brackets 123 are placed on the upper side of the upper and middle container support members 122, respectively, but can be placed on the lower side of the same. Both the ends 123a and 123b of each bracket 123 with the pillar 121 therebetween can function as the support portions for the hang rod members 150. Between the middle and lower brackets 123, an auxiliary bracket 124 is mounted to the pillar 121. In this embodiment, when the culture container 130 is moved down from the upper stage to the middle stage, as the plants grow higher, new hang rod members 150 are attached to the middle brackets 123 to continue the culture. Under such circumstances, an auxiliary bracket 124 can be used in order to secure temporary support places for the hang rod members 150 used in the upper stage immediately after moving or, as required, an auxiliary bracket 124 can be used in order to permit the hang rod members 150 used in the upper stage to be used until the plant grows to a certain height.

The shapes of the brackets 123 and the auxiliary bracket 124 are not restricted. However, an L-section is preferably used for the brackets 123 and the auxiliary bracket 124 in order that they may readily hold the hang rod members 150. Further, the brackets are preferably provided with U-like notches at the positions at which the hang rod members 150 are placed.

The culture containers 130 are each composed of a long and narrow box body having a square, rectangular or semicircular cross section. The plants can be wholly planted in such culture containers 130 using a medium such as rock wool or the like filled therein, but since the culture containers 130 are moved, it is preferable to reduce the amount of medium as much as possible to reduce the total weight. Hence, it is preferable to set the plants into the media formed in a predetermined shape, for example, cubic rock wool or the like and then to align the media at a predetermined interval in the culture containers 130. The culture containers 130 containing the media therein correspond to the culture beds described in the first embodiment. Hence, in this specification, movement of the culture beds is substantially equivalent to that of the culture containers 130.

The hang rod members 150 are constituted by a rod and are supported in a parallel arrangement on the ends 123a and 123b of the brackets 123 mounted onto the support units 120, as described above. In this embodiment, the hang wires 140, formed of wire or the like, are extended to the culture containers 130 from the portions near the ends of the hang rod members 150, and as a result, the culture containers 130 are held stable, as described above. More specifically, two hang rod members 150 are used for each stage and are placed in parallel on the ends 123a and 123b (defined by U-like notches) of the brackets 123 at an approximately equal distance from the pillars 121. Thus, the two hang wires 140 are extended to the culture containers 130 in a V-like form. That is, the culture containers 130 are held at the three points by the upper end portions of the hang wires 140 and the container support members 122, and therefore, even when the area of the container support members 122 supporting the culture containers 130 is smaller than the width of the culture containers 130, stability can be ensured.

The hang rod members 150 are usually moved along with the culture containers 130, in other words, the hang rod members 150 are required to be insertable between the pillars 121 and thus are made shorter than the distance therebetween.

In this case, when the culture container 130 is placed on the upper stage, the leading cords 160 are not necessary because the height of the plants is not as great. However, since the plants do grow to some height, leading cords 160 corresponding to the number of the plants can be suspended from the hang rod members 150 towards the culture containers 130 in order to promote growth and to stabilize the duration of any growth when the culture container 130 is moved down to the middle or lower stage on the middle or lower container support members 122. The hang rod members 150 used for this purpose are subsequently described as rod members.

In this embodiment, a nutrient solution supply system is composed of a main liquid supply tube (not shown), nutrient solution supply tubes 125 and liquid supply tubes 126. The nutrient solution supply tubes 125 are coupled to the main liquid supply tube laid under the ground and are fixed along the pillar 121. In this embodiment, three nutrient solution supply tubes 125 (corresponding to three culture containers 130) are mounted to the upper, middle and lower stages. The tips 125a, of the nutrient solution supply tubes 125, are directed to the liquid receive inlets 126a at the ends of the liquid supply tubes 126 mounted in one end portion of the culture containers 130. The liquid supply tubes 126 are each formed with a liquid receive inlet 126a at one end, the other end being closed; and with a suitable number of small openings 126b in its wall, as shown in FIG. 5. Hence, when the nutrient solution supplied to the inlet 126a reaches a predetermined amount, the nutrient solution comes out of the small openings 126b to be supplied to the media contained in the culture containers 130. In this case, the nutrient solution supplied from the nutrient solution supply tubes 125 is received by the inlets 126a which are not directly connected to, or contacted by, the tips 125a of the nutrient solution supply tubes 125. Accordingly, when the culture containers 130 are moved, no disconnection or reconnection of the nutrient solution supply tubes 125 from or with the liquid supply tubes 126 is necessary.

Further, in this embodiment, a drainage discharge system is composed of a main drainage tube (not shown), drainage tubes 127, drainage receiving outlets 128 and drainage discharge tubes 129. In this case, three drainage tubes 127 are set so as to correspond to the three stages of the culture containers 130 in the same manner as the nutrient solution supply tubes 125. More specifically, one end 127a of each of the drainage tubes 127 is connected to a respective one of the drainage receiving outlets 128. The outlets 128 are fixed to the container support members 122 which are themselves mounted to the pillar 121 at the opposite end of the culture containers 130 to which the inlets 126a of the liquid supply tubes 126 are mounted. The other end of each of the drainage tubes 127 is connected to the main drainage tube laid under the ground.

The nutrient solution supplied to the culture containers 130 is discharged into drainage-receiving outlets 128 via the drainage discharge tubes 129, which are secured so as to project outside through the other end walls 130a of the culture containers 130 (the end walls on the side where the other ends of the culture containers 130 are supported by the container support members 122 to which the drainage receiving outlets 128 are mounted). As shown in FIG. 5, one end of each drainage discharge tube 129 opens upwards at a predetermined level within the culture container 130 and the other end of the same opens downwards right above each drainage receiving outlet 128. In this embodiment, drainage receiving outlets 128 are not directly connected or contacted with drainage discharge tubes 129 and hence no disconnection or reconnection of these two members is required even when the culture containers 130 are moved, which is very advantageous, in the same manner as the relationship between the nutrient solution supply tubes 125 and the liquid receiving inlets 126a.

As shown in FIG. 5, when L-shaped pipes, preferably having a circular cross section, are used for the drainage discharge tubes 129, rotation of such a pipe around its straight portion (which projects horizontally through the wall of the culture container 130) allows the height of a drainage inlet 129a of the drainage discharge tube 129 within the culture container 130 (the distance from the bottom of the culture container 130 to the drainage inlet 129a of the drainage discharge tube 129) to be changed, and hence the amount of the nutrient solution stored within the culture containers 130 can readily be adjusted.

In this embodiment, the culture container lift means 170 includes culture container holding means 171 which can move to or away from the longitudinal sides of the culture containers 130, and also hold, and move up and down, the culture containers 130 so as to move down the culture containers 130 from the upper stage to the lower stage, that is, from the upper container support members 122 to the lower container support members 122. The construction of the culture container lift means 170 is not limited in principle, so long as the culture container lift means 170 is provided with the culture container holding means 171.

In this specification, references to means for moving to or away from the culture container 130 mean any means that can move so as to hold or carry the culture container 130 itself, or the hang rod members 150 supporting the culture container 130, or to stop the holding or carrying, or to separate from the same. For example, a robot arm simulating the motion of a human arm can move to the culture container 130 from any direction to hold or carry the culture container 130, or to stop the holding or carrying the culture container 130, or to separate from the same in any direction. In this embodiment, the culture container lift means 170 can move under the culture container 130 or the hang rod members 150, or under both the culture containers 130 and the hang rod members 150, to hold or carry the same.

In this instance, for example, a rod-like member (not shown) can be mounted to be movable forwards and backwards in a cylinder, and the rod-like member can be controlled to move forwards and backwards and to lift a container up and down using servo-motors or the like, thereby freely changing the position of the rod-like member from one position to another position.

In this embodiment, the culture container lift means 170 can be produced simply at low cost. The culture container lift means 170 includes a base 172, an upright post 173 vertically standing from the base 172, and the culture container holding means 171, that is, first, second and third U-like culture container holding means 171a, 171b and 171c which are mounted to the post 173 so as to be movable or slidable up and down along the post 173, and to project their bifurcated portions horizontally towards the culture containers 130.

The first culture container holding mean 171a for the upper stage can be moved up and down independently of the second and third culture container holding means 171b and 171c for the middle and lower stages. The second and third culture container holding means 171b and 171c are coupled with each other by a coupling member 174 so as to move up and down together.

The driving means for moving the culture container holding means 171a, 171b and 171c is not restricted and servo motors or the like can be used, as described above. As shown in FIG. 4, simpler means, two pulleys 176, are mounted to the top of the post 173 and first and second drive strings (not shown) are connected to the first and second culture container holding means 171a and 171b, respectively, via the two pulleys 176 so as to move the culture container holding means 171a, 171b and 171c up and down by manual means. By pulling or pulling back the first drive string, the first culture container holding means 171a is moved up and down; and by pulling or pulling back the second drive string, the second and third culture container holding means 171b and 171c are moved up and down simultaneously. On the other hand, the two drive strings may be stretched to a winch 178, so that by operating the winch 178, the culture container holding means 171a, 171b and 171c can be moved up and down simultaneously.

In FIG. 4, on the upper surface of each of the bifurcated projections of the first culture container holding means 171a, two pairs of small projections 171a1 171a2, and 171a3, 171a4 are formed at a predetermined interval so as to hold the hang rod members 150 between the small projections. Similarly, on the upper surface of each of the bifurcated projections of the second culture container holding means 171b, two pairs of small projections 171b1, 171b2 and 171b3, 171b4 for holding the hang rod members 150 are formed in its outer end portions, and a pair of small projections 171b5 and 171b6 for holding the culture container 130 are further formed in its central portion at a spacing nearly equal to the width of the culture container 130. Further, on the upper surface of each of the bifurcated projections of the third culture container holding means 171c, only a pair of small projections 171c5, 171c6 for holding the culture container 130, are formed in its tip portion.

The base 172 includes a first base part 172a having a frame structure and a second base part 172b also having a frame structure. The first base part 172a is movably supported on a pair of parallel rails 175 installed along the work passage by means of four rollers 172c mounted on the bottom of the first base part 172a. The first base part 172a is further provided with a pair of guide grooves 172d extending perpendicularly to the rails 175. The second base part 172b is movably mounted on the first base part 172a by engaging its side ends 172e with the guide grooves 172d of the first base part 172a, so as to be slidable or movable to, or away from, the longitudinal sides of the culture containers 130. The post 173 is secured upright onto the center of the second base part 172b. Accordingly, the culture container holding means 171a, 171b and 171c mounted on the post 173 can be moved to, or away from the longitudinal sides of the culture containers 130 by moving the second base part 172b, and be further moved parallel to the longitudinal sides of the culture containers 130 by moving the first base part 172a on the rails 175. In this embodiment, although the culture container holding means 171a, 171b and 171c are moved by sliding the first base part 172a via the rollers 172c and sliding the second base part 172b, the present invention is not restricted to such a construction. Further, in this embodiment, the reason why the culture container lift means 170 is mounted so as to move along the work passage formed parallel to the longitudinal sides of the culture containers 130 in the greenhouse is that usually a plurality of support units 120 supporting the culture containers 130 are placed in a longitudinal direction of the culture containers 130 in the greenhouse and movement of the culture containers 130 can be carried out by only one culture container lift means 170.

In this embodiment, rails 175 are laid along the work passage for this sole purpose. However, hot water supply pipes for controlling the temperature within the greenhouse are usually installed along the work passage, and thus can be advantageously used as rails to reduce cost.

Next, the operation of the multistage plant culture apparatus 110 described above will be described in detail.

First, it is assumed that culture containers 130 are placed on the upper, middle and lower container support members 122, as shown in FIG. 4. Further, in the case of tomato plant culture, the upper culture container 130 contains the seedlings planted shortly before in the cubic media at a predetermined interval, the middle culture container 130 contains plants reaching any growth period towards the start of harvest, and the lower culture container 130 contains plants reaching any growth period after early fruiting.

In this situation, when the culture containers 130 are moved, the lower culture container 130 is initially removed manually, for example, after the final harvest in one multistage plant culture apparatus 110. At this time, after the hang wires 140 are removed from the culture container 130 and the hang rod members 150 are also removed from the brackets 123, the lower culture container 130 is removed from the lower stage position.

Next, the culture container lift means 170 is moved on the rails 175 to face the longitudinal sides of the culture containers 130 in the multistage plant culture apparatus 110. In this case, this movement of the culture container lift means 170 can be conducted before removing the lower culture container 130. Then, the first culture container holding means 171a is moved up or down so as to roughly face the upper hang rod members 150. Next, by moving the second base part 172b forward (in the direction perpendicular to the direction of movement of the first base part 172a), the first culture container holding means 171a is inserted under the upper hang rod members 150 so that the small projections 171a1, 171a2, 171a3 and 171a4 of the first culture container holding mean 171a may be positioned right under the hang rod members 150. Next, the first culture container holding means 171a is lifted to hold the upper hang rod members 150 and to lift the upper culture container 130 supported by the upper hang rod members 150, resulting in removing the same from the upper container support members 122.

At this time, by forward movement of the second base part 172b (similar to that of the first culture container holding means 171a) the second culture container holding means 171b is inserted under the middle hang rod members 150 so that the small projections 171b1, 171b2 and 171b3, 171b4 of the second culture container holding means 171b may be positioned right under the middle hang rod members 150. The third culture container holding means 171c is also inserted under the middle culture container 130 so that the small projections 171c5 and 171c6 of the third culture container holding means 171c may be positioned right under the middle culture container 130. Next, the second culture container holding means 171b is lifted along with the first culture container holding means 171a to hold the middle hang rod members 150, and to lift and remove the middle culture container 130 from the middle container support members 122.

The second base part 172b is then moved backwards so as to permit the culture container holding means 171a, 171b and 171c to move away from the multistage plant culture apparatus 110 to a position such that there is no obstacle (such as culture containers 130 and the hang rod members 150) when the culture container holding means 171a, 171b and 171c are moved up and down, that is, the tips of the culture container holding means 171a, 171b and 171c may be moved away from the container support members 122 towards the passage. Thereafter, the culture container holding means 171a, 171b and 171c are moved down until the third culture container holding means 171c is positioned slightly above the lower container support members 122.

By moving the second base part 172b forward, the culture container holding means 171a, 171b and 171c are moved forward until the culture container 130 removed from the middle stage is positioned right above the lower container support members 122. The second and third culture container holding means 171b and 171c are moved down to place the culture container 130 on the lower container support members 122, and to make the lower brackets 123 on the support units 120 support the hang rod members 150. Next, the first culture container holding means 171a is moved down so as to place the culture container 130 removed from the upper stage on the middle container support members 122, and to make the auxiliary brackets 124 on the support units 120 support the hang rod members 150.

As described above, the culture containers 130 placed on the upper and middle stages are moved down to the middle and lower stages. A new culture container 130 is then placed on the vacant upper stage, that is, the upper container support members 122, as follows.

First, the first base part 172a is moved to a position suitable for the operation. Next, after the first culture container holding means 171a is adjusted to a suitable height for the operation, the hang rod members 150 and the hang wires 140 are fixed to the new culture container 130 containing seedlings planted shortly before, and the hang rod members 150 supporting the new culture containers 130 are placed on the first culture container holding mean 171a. Further, new hang rod members 150, along with the hang wires 140 attached thereto, are placed on the second culture container holding means 171b.

The first base part 172a is then moved to the operation position. The second culture container holding means 171b is moved up or down so that the height of the second culture container holding means 171b may be slightly above the middle brackets 123, and the second base part 172b is moved forward. The second culture container holding means 171b is moved down to make the middle brackets 123 support the hang rod members 150. Similarly, the first culture container holding means 171a is moved down to make the upper brackets 123 support the hang rod members 150 supporting the new culture container 130, and to place the new culture container 130 on the upper container support members 122. The hang wires 140 (attached to the new middle hang rod members 150 supported by the middle brackets 123) are fixed to the middle culture container 130 in the same manner as described above. At this time, the hang rod members 150 supported by the auxiliary bracket 124 are removed.

The operation of moving the culture containers in the multistage plant culture apparatus is completed in the manner described above. The culture container lift means 170 is moved along the rails 175 to an adjacent multistage plant culture apparatus and the foregoing operation to the culture containers 130 is repeated between the support units 120.

In this embodiment, although the first culture container holding means 171a of the culture container lift means 170 is moved up and down independently of the second and third culture container holding means 171b and 171c, the first culture container holding means 171a can be coupled with the second and third culture container holding means 171b and 17c so that all the culture container holding means 171a, 171b and 171c can move up and down simultaneously. In such an arrangement, which is different from that of the above-described embodiment, when the upper and middle culture containers 130 are moved down onto the middle and lower container support members 122, it is impossible to lift up only the upper culture container 130 in advance, so as to prevent its being an obstruction for the movement of the middle culture container 130. Hence, of course, from a mechanical viewpoint it is necessary to move the upper and middle culture containers 130 up and down simultaneously. In such a construction, it is sufficient to use one pulley and a first drive string to move the culture container holding means 171a, 171b and 171c up and down.

Further, in this embodiment, the middle and lower brackets 123 are mounted on the upper and middle container support members 122. Hence, the hang rod members 150 for the middle stage are higher than the bottom of the upper culture container 130. Accordingly, as described above, when the middle culture container 130 is moved down, it is necessary to lift up only the upper culture container 130 in advance so as to prevent the upper culture container 130 from being an obstruction to the movement of the middle culture container 130. Alternatively, it is necessary to move the upper and middle culture containers 130 simultaneously. Hence, the middle brackets 123 can be mounted to the upright pillar 121 at a lower position than the upper container support members 122 and, in this instance, the middle culture container 130 can be moved down directly without previously lifting the upper culture container 130 up. In this case, as in the foregoing embodiment, the first culture container holding means 171a may be moved up and down independently of the second culture container holding means 171b in the culture container lift means 170.

As described above, by applying a multistage plant culture method according to the present invention, any lost period in which fruit cannot be harvested, is greatly shortened, and a continuous harvest of fruit can be conducted so as to yield an increased crop, compared with any conventional method. In particular, the harvest is not concentrated in one period or season and the demand for labor is made uniform throughout the year, resulting in an improvement in labor efficiency. In addition, sunshine conditions are good during the early culture period until the first half of the growth stage, and hence quality is not affected. Further, the plants are grown in multistage supporting means at different heights and thus a nutrient solution supply suitable to each growing stage of the plants can be provided. In particular, it is sufficient to control the nutrient solution supply strictly only in the first half of the growth stage in which vegetative growth predominates; and it is not necessary to balance the nutrient solution supply between vegetative growth and reproductive growth as in a long stage culture method. As a result, the nutrient solution as a whole is easily supplied. Moreover, the labor tasks at each stage can be determined, and hence labor management becomes easier and more reasonable. Further, in the latter half of the growth stage during which reproductive growth mainly takes place, even when drainings from the nutrient solution supplied in the first half of the growth stage (in which vegetative growth mainly occurs) is employed quality is not affected; and in terms of environmental protection, nutrient solution costs and drainage treatment costs, many other advantages arise.

Further, according to the present invention, in a multistage plant culture apparatus suited to the foregoing multistage plant culture method, long and narrow culture containers on stages at different heights are supported by support means composed of pillars, brackets mounted to the pillars to project sideways and/or container support members mounted to the pillars; hang wires stretched from the brackets; and hang rod members placed on the brackets, that is, the culture containers are supported by only thin members such as the rods and the strings. Hence, the interception of sunlight falling on plants planted in the culture containers placed on the middle and lower stages is reduced, and thus the sunlight conditions for the plants growing in the culture containers placed on the middle and lower stages is greatly improved, as compared with those on the upper stage. On the other hand, although the culture containers are supported by such thin rods and strings, by using the hang rod members and the hang cords stretched therefrom to the culture containers, stability of the culture containers is sufficient.

Moreover, manual operation is required only when the lower culture container is removed, so that movement of the culture containers can be carried out effectively. Hence, the multistage plant culture apparatus is suited to the aforementioned multistage plant culture method.

Furthermore, as described above, it is apparent that the multistage plant culture apparatus for use in the multistage plant culture according to the present invention is well suited to automation, reduces the need for manual operation and enables large scale culture.

Although the present invention has been described in its preferred embodiments with reference to the accompanying drawings, it readily understood that the present invention is not restricted to the preferred embodiments and that various changes and modifications can be made by those skilled in the art without departing from the spirit and scope of the present invention

What is claimed is:

1. A multistage plant culture method using a plant culture apparatus having a plurality of stages at different heights for supporting culture beds, each culture bed containing plants, comprising the steps of:

arranging at least one of the culture beds on an uppermost one of the stages;

determining a planned harvest period H during which fruit may be harvested from the plants and a planned whole culture period T1 which is the period from seeding, cutting and grafting of the plants to the end of the harvest of the fruit from the plants, maintaining the plants on each of the stages for a predetermined culture period equal to the planned harvest period, removing any of the culture beds on a lowermost one of the stages from the lowermost stage after the planned harvest period H, the plants in the culture bed(s) in the lowermost stage remaining in the lowermost stage during the planned harvest period and being harvestable while therein;

moving down the culture beds in order from the uppermost stage to the lowermost stage after the plants have been maintained on each stage for the predetermined culture period such that the uppermost stage is vacated;

placing a new one of the culture bed containing the plants grown for a seedling raising period P on the vacant uppermost stage;

repeating said culture bed removing step, said culture bed moving down step and said new culture bed placing step, determining a number N (N=integer) of the stages of the plant culture apparatus so as to satisfy a formula H×N≦T1, and determining the seedling raising period P for the plants from the time of the seeding, the cutting and the grafting of the plants until the moving of the new culture bed containing the seeded plants onto the uppermost stage so as to satisfy a formula P=T1−(H×N).

2. A multistage plant culture method of claim 1, wherein the multistage plant culture apparatus has two stages, and wherein the culture beds are moved down from the upper stage to the lower stage after the plants are grown on the upper stage from the end of the seedling raising period until a time of early fruiting and thereafter the plants are grown on the lower stage until the harvest is completed whereby the period from the end of the seedling raising period until the time of early fruiting is equivalent to the predetermined culture period.

3. A multistage plant culture method of claim 2, wherein the culture beds are moved down from the upper stage to the lower stage after the plants are grown on the upper stage from the end of the seedling raising period till a growing-tip pinching time and thereafter the plants are grown on the lower stage till the harvest finish whereby the period from the end of the seedling raising period until the growing-tip pinching time is equivalent to the predetermined culture period.

4. A multistage plant culture method of claim 2, wherein plants to be grown by a growing method for successively flowering and fruiting in at most three different parts are used.

5. A multistage plant culture method of claim 2, wherein plants to be grown by a training method for successively flowering and fruiting in at most three different parts are used.

6. A multistage plant culture method of claim 1, wherein the multistage plant culture apparatus has three stages, and wherein the culture beds are moved down from the uppermost stage to a middle one of the stages after the plants are grown on the uppermost stage from the end of the seedling raising period until a time of early flowerbud differentiation, and the culture beds are moved down from the middle stage to lowermost stage after the plants are grown on the middle stage from the time of early flower-bud differentiation until the time of early fruiting, and thereafter the plants are grown on the lowermost stage till harvest finishes whereby the period from the end of the seedling raising period until the time of early flower-bud differentiation and the period from the time of early flower-bud differentiation until the time of early fruiting are equivalent to the predetermined culture period.

7. A multistage plant culture method of claims 6, wherein the culture beds are moved down from the uppermost stage to the riddle stage after the plants are grown on the upper stage from the end of the seedling raising period until a time of early flower-bud differentiation at the earliest and a time of early fruiting at the latest, and the culture beds are moved down from the middle stage to the lowermost stage after the plants are grown on the middle stage from the time between early flower-bud differentiation or early fruiting until a growing-tip pinching time, and thereafter the plants are grown on the lowermost stage from the growing-tip pinching time until the harvest is completed whereby the period from the end of the seedling raising period until the time between early flower-bud differentiation and early fruiting is equivalent to the predetermined culture period.

8. A multistage plant culture method of claim 1, wherein the culture beds are elongate, further comprising the step of:

planting the plants in the culture beds in at least one line in a longitudinal direction of the culture beds.

9. A multistage plant culture method of claim 1, wherein the multistage plant culture apparatus has two stages, and wherein the culture bed is moved down from the upper stage to the lower stage after the plants are grown on the upper stage from the end of the seedling raising period until a time of harvest commencement and thereafter the plants are grown on the lower stage until the harvest is completed such that the period from the end of the seedling raising period until the time of harvest commencement is equivalent to the predetermined culture period.

10. A multistage plant culture method of claim 1, wherein the multistage plant culture apparatus has two stages, and wherein the culture bed is moved down from the upper stage to the lower stage after the plants are grown on the upper stage from the end of the seedling raising period until a time between early fruiting and harvest commencement and thereafter the plants are grown on the lower stage until the harvest is completed such that the period from the end of the seedling raising period until the time between early fruiting and harvest commencement is equivalent to the predetermined culture period.

11. A multistage plant culture method of claim 1, wherein the multistage plant culture apparatus has three stages, and wherein the culture beds are moved down from the uppermost stage to a middle one of the stages after the plants are grown on the uppermost stage from the end of the seedling raising period until a time between early flower-bud differentiation and early fruiting, and the culture beds are moved down from the middle stage to the lowermost stage after the plants are grown on the middle stage from the time between early flower-bud differentiation and early fruiting until the time of harvest commencement, and thereafter the plants are grown on the lowermost stage till harvest finishes whereby the period from the end of the seedling raising period until the time between early flower-bud differentiation and early fruiting and the period from the time between early flower-bud differentiation and early fruiting until the time of harvest commencement are equivalent to the predetermined culture period.

12. A multistage plant culture method of claim 1, wherein the multistage plant culture apparatus has three stages, and wherein the culture beds are moved down from the uppermost stage to a middle one of the stages after the plants are grown on the uppermost stage from the end of the seedling raising period until a time of early flower-bud differentiation, and the culture beds are moved down from the middle stage to the lowermost stage after the plants are grown on the middle stage from the time of early flower-bud differentiation until the time of harvest commencement, and thereafter the plants are grown on the lowermost stage till harvest finishes whereby the period from the end of the seedling raising period until the time of early flower-bud differentiation and the period from the time of early flower-bud differentiation until the time of harvest commencement are equivalent to the predetermined culture period.

13. A multistage plant culture method of claim 1, wherein the multistage plant culture apparatus has three stages, and wherein the culture beds are moved down from the uppermost stage to a middle one of the stages after the plants are grown on the uppermost stage from the end of the seedling raising period until a time of early fruiting, and the culture beds are moved down from the middle stage to the lowermost stage after the plants are grown on the middle stage from the time of early fruiting until the time of harvest commencement, and thereafter the plants are grown on the lowermost stage till harvest finishes whereby the period from the end of the seedling raising period until the time of early fruiting and the period from the time of early fruiting until the time of harvest commencement are equivalent to the predetermined culture period.

* * * * *